United States Patent Office 3,326,629
Patented June 20, 1967

3,326,629
FASTNESS PROPERTIES OF DYEINGS AND PRINTS OBTAINED WITH SULFUR DYES
Christian Heid, Frankfurt am Main-Fechenheim, Germany, assignor to Cassella Farbwerke Mainkur Aktiengesellschaft, Frankfurt am Main-Fechenheim, Germany, a German company
No Drawing. Filed Aug. 21, 1964, Ser. No. 391,314
Claims priority, application Germany, Sept. 11, 1963, C 30,874
1 Claim. (Cl. 8—74)

This invention relates to an advantageous modification in the process for improving the fastness properties of dyeings and prints obtained with sulfur dyes.

It is known that the fastness properties, especially the fastness to washing, of dyeings and prints obtained on textile materials with sulfur dyes do not satisfy the requirements generally desired.

In German Patent 134,177 there is described a process in which dyeings freshly prepared from sulfur dyes, are subjected to an alkylation with halo-acetamides to improve the fastness properties. By such aftertreatment an improvement of the fastness to washing with peroxide is indeed obtained, however, the fastness to washing with soap and sodium carbonate and, in particular, the so-called dextrin fastness to washing—i.e. the fastness to washing of a dyed fabric finished with dextrin—are thus distinctly impaired. By this aftertreatment with halo-acetamides effecting an alkylation, the mercapto groups of the sulfur dyes are prevented from being oxidized and from being transformed into sulfonic acid groups, as said groups would increase the solubility of the dyes and impair the wet fastness properties. On the other hand, particularly at elevated temperatures, alkaline washing liquors saponify the acid amide groups which had been introduced by the alkylation with halo-acetamides whereby carboxylic acid groups are probably formed increasing the solubility of the dyed and printed dyes and thus impairing the fastness to washing.

This invention now relates to an advantageous modification in the process for improving the fastness properties of dyeings and prints obtained with sulfur dyes in which the freshly prepared dyeings and prints are impregnated with substances yielding stable reaction products with the dyes, said modification comprises using as agent for aftertreating a halo-carboxylic acid amide selected from the group consisting of tri-(chloroacetyl)-diethylene-triamine, di-(chloroacetyl)-ethylene-diamine, tri-(chloroacetyl) - dipropylene-triamine, tri-(chloroacetyl)-di-isopropylene-triamine, di-(chloroacetyl)-propylene-diamine, di-(chloroacetyl)-isopropylene-diamine in an amount of 0.1–5% related to the dry weight of the dyed and printed material.

It is surprising that dyeings and prints prepared from sulfur dyes after the treatment according to the present invention show considerably improved fastness to washing, especially on dextrin-finished materials, as compared with those aftertreated with halo-acetamides. It must be assumed that the carbonamido groups introduced by the aftertreatment according to the present invention are far more resistant against hydrolytical effects than those introduced by means of halo-acetamides which could really not be expected.

Another considerable advantage of the compounds utilized under the present invention over those known in the art is that they do not decrease the fastness to light of dyeings and prints prepared from sulfur dyes. This is particularly significant as the fastness to light of dyeings and prints prepared from the majority of sulfur dyes is at the limit of technical requirements. Since a further decrease of the fastness properties as produced by the agents for after-treating known in the art must be avoided, their application would have to be dispensed with generally.

The present invention is distinguished by disclosing new aftertreating agents for dyeings and prints prepared from sulfur dyes, that do not exert a negative influence neither on the fastness to light nor on the fastness to washing.

The invention is further described and illustrated in the following examples, wherein percentages unless otherwise specified are based on the weight of fiber being treated. The symbols "g./l." and "c.c./l." wherever employed hereinafter designate grams per liter and cubic centimeters per liter, respectively temperatures unless otherwise indicated are in degrees centigrade.

EXAMPLE 1

A continuous dyeing of Indocarbon CL for Sol (Color Index No. 53290) on cotton fabric prepared with 20 g./l. of the dye and 20 g./l. crystallized sodium sulfide is, after rinsing with cold water, squeezed off to a 70% pick-up of liquor, impregnated with a solution of 10 g./l. tri-(chloroacetyl)-diethylene-triamine, and squeezed off again to a 90% pick-up of liquor (accordingly the additional pick-up of liquor is 20% of the weight of the material). Thereupon, the fabric is steamed for 30 seconds at 105°, rinsed, and dried.

Thus, a dyeing is obtained possessing very good fastness properties, in particular with respect to washing with peroxide, and in the boiling test with sodium carbonate.

EXAMPLE 2

A dyeing of Hydron Blue R for Sol (Color Index No. 53630), on cotton cheeses, prepared with 3% of the dyestuff, 6 c.c./l. sodium hydroxide solution 38° Bé., and 5 g./l. sodium dithionite in the liquor ratio 1:0, is rinsed cold, the rinsing liquor is sucked off and then the material is treated under circulation in a liquor ratio 1:10 with 1% (related to the dry weight of the material) di-chloroacetyl)-ethylene-diamine for 5 minutes at 90° C.

The dyeing thus obtained shows a good fastness to washing with peroxide and to boiling with sodium carbonate.

It will be understood that this invention is susceptible to further modification and, accordingly, it is desired to comprehend such modifications within this invention as may fall within the scope of the appended claim.

I claim:

A process for improving the fastness properties of dyeings or prints prepared with sulfur dyes comprising impregnating the freshly prepared dyeings or prints with a halo-carboxylic acid amide selected from the group consisting of tri-(chloroacetyl)-diethylene-triamine, di-(chloroacetyl) - ethylene - diamine, tri - (chloroacetyl) - dipropylene - triamine, tri - (chloroacetyl) - di - iso - propylene - triamine, di - (chloroacetyl) - propylene - di-amine, di - (chloroacetyl) - iso - propylene - diamine in an amount of 0.1–5% related to the dry weight of the dyed and printed material.

References Cited

FOREIGN PATENTS 134,177    2/1901    Germany.

NORMAN G. TORCHIN, *Primary Examiner.*

D. LEVY, *Assistant Examiner.*